July 8, 1941.  H. T. CORY  2,248,066
STRIPPING HARVESTER
Original Filed Nov. 21, 1939  2 Sheets-Sheet 1

Inventor
Harry Thomas Cory
By
Attorneys

Patented July 8, 1941

2,248,066

UNITED STATES PATENT OFFICE 2,248,066

STRIPPING HARVESTER

Harry Thomas Cory, Washington, D. C.

Original application November 21, 1939, Serial No. 305,520. Divided and this application April 9, 1940, Serial No. 328,678

2 Claims. (Cl. 56—219)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This is a divisional application of my co-pending application for patent, Serial No. 305,520, filed November 21, 1939.

This invention relates to a machine for stripping grains from cereal stalks, and is more particularly concerned with new and useful improvements of the stripping harvester described and claimed in the patent issued to me on April 4, 1939, No. 2,152,730.

One of the objects of the present invention is to improve the structural combinations of the device described in the abovementioned patent for more efficient and practical operation. The embodiment described in said patent, while broadly covering the essential features of my invention, is subject to excessive wear of certain parts and is not easily repaired.

With the above in mind, I have now provided an improved machine which is ordinarily adaptable to mass production, which is more positively operating, easier to repair, and more efficient in operation. The essential features of these improvements comprise a simpler method of mounting the teeth and an improved method of cleaning the teeth. With the new arrangement of parts, it will be seen that the machine may be constructed in units, from which any desired capacity of machine may be fabricated. Also the new construction enables the machine to be shipped in a knock-down form and various parts thereof may be nested together so as to occupy a minimum of space in shipping.

The following description, considered together with the accompanying drawings, will disclose this invention more fully, its construction, arrangements, and operations of parts, and further objects and advantages thereof will be apparent.

Figure 1:
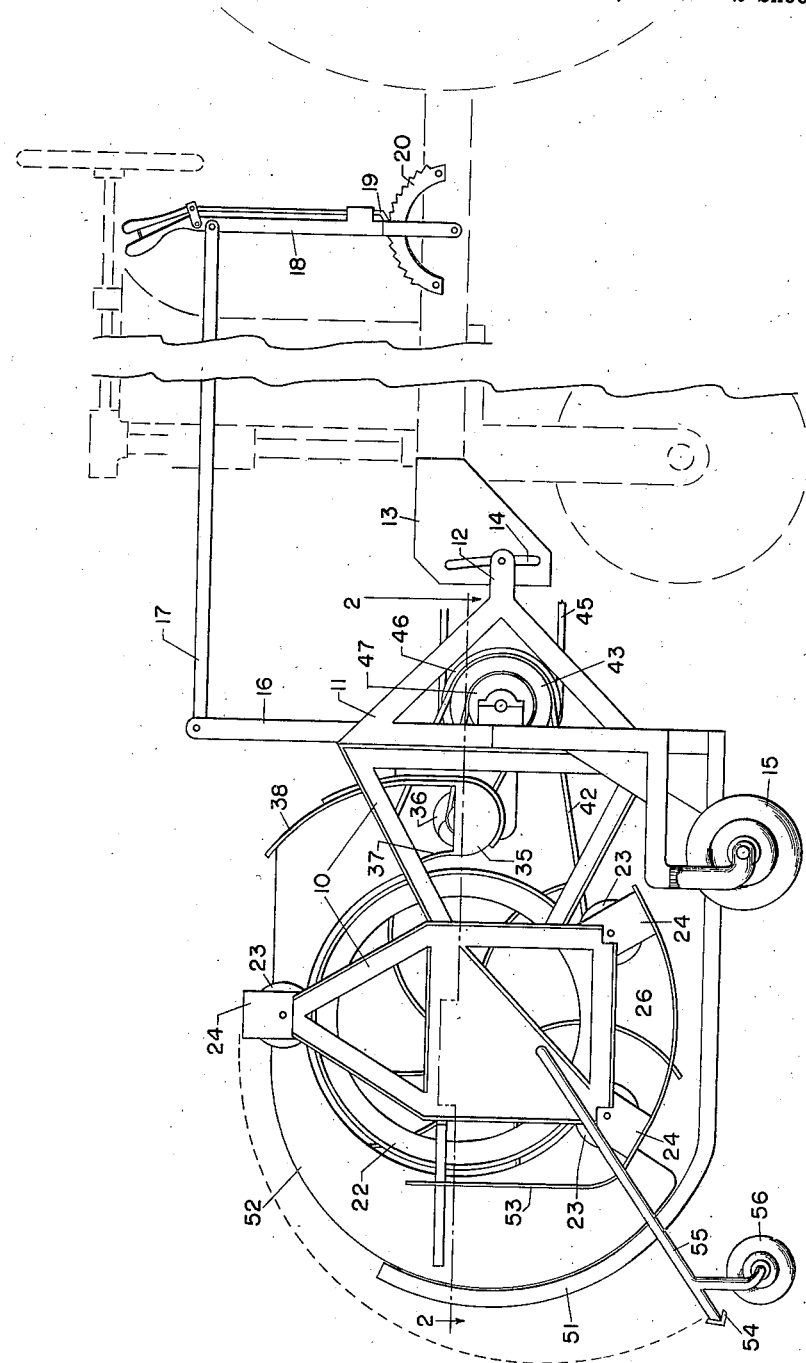
Figure 1 is a side elevational view of an embodiment of this invention as it appears attached to the front of an ordinary farm tractor, the tractor being shown fragmentarily.

Referring with more particularity to the drawings in which like numerals designate like parts, the device is mounted between two end frames 10, 10. These two end frames are connected by a lateral girder 11, sufficiently stiffened. This girder is connected to a bracket 13 on the front of the tractor by means of horizontal bars 12, operating in vertical slots 14 in said brackets. While ordinarily only two of such connections are necessary, any additional number may be employed depending upon the size of the machine. The device is preferably supported on the ground by means of castors 15, suitably connected to the framework. It is preferable for the castors to be disposed just rearward of the center of gravity. Stanchions 16 are secured to the frame of the machine and are connected by links 17 to an operating lever 18 on the tractor, which lever is provided with a dog 19 adapted to register with a notched segment 20. By these means the elevation of the device may be adjusted. Also, since the center of gravity is forward of the castors 15, the link 17 is always in tension.

Between the end frames 10, 10, the cylinder assembly 21 is disposed. This cylinder assembly is made up of sections which will be hereinafter more fully described. The cylinder assembly is connected at each end to a double flanged ring 22 and is thus supported on trunnion rollers 23. The trunnion rollers are mounted between U-brackets 24, one side of which is fixed to the respective end frame. The rollers 23 are adapted to fit between the flanges of the rings 22 and the construction is such that the rollers absorb any axial thrust delivered to it by the flanges. In this manner the cylinder assembly 21 is freely rotatable and is supported solely on the end frames by said rollers 23. These rollers also reduce the friction in operation.

Within the cylinder assembly 21, there is mounted an eccentric shaft 25, which is secured to the end frames 10, 10. The direction of eccentricity should be such as to afford an optimum operation of the machine through the crops to be harvested. To said shaft 25 the stripping teeth 26 in the form of combs 27 are revolvably mounted. The combs are mounted as units by means of bands 28, there being at least two bands for each comb. These bands 28 should be stiff and, for this reason, it is preferable to make them in two parts, as illustrated, depending upon the connection to the combs to hold them securely about the shaft 25. This connection should be demountable and may be accomplished by means of bolts and nuts 29, so that repairs or substitutions may be easily made. The teeth 26 of the combs curve forwardly and operate through apertures in the cylinder assembly.

As indicated in my prior patent above mentioned, the eccentricity of the shaft 25 should be such that at some point in the operation the teeth of the combs will be drawn fully into the cylinder. By means of the construction shown in the present drawing, it is possible to draw the teeth in even further than was possible in the construction shown in my prior patent in view of the additional distance permitted by reason of the diameter of the cylinders 31, so that there is not simply a point, but an appreciable angle in the rotation of the cylinder through which the teeth of the comb do not project from the cylinder. Within this distance the collecting means may be disposed, which means comprises a trough 35 within which a conveyor screw 36 is rotatably mounted. The forward side of the trough 37 extends upward to act as a guide for the grain, and the rearward side of the trough 38 extends upward a considerable distance and acts as a shield to prevent the loss of grain coming around over the cylinder which may be thrown in various directions.

Figure 2:
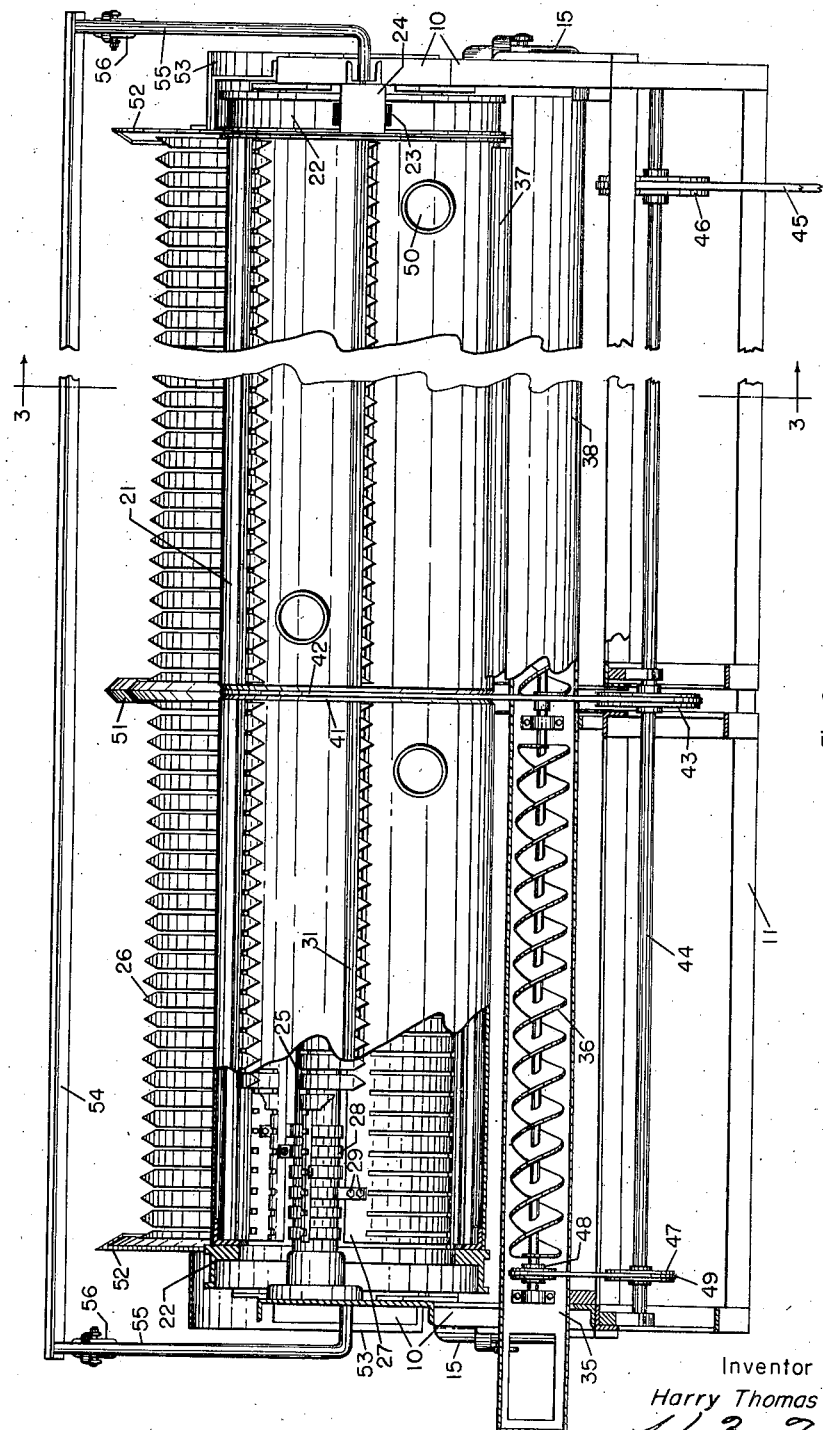
Figure 2 is a top plan view of the embodiment detached from the tractor with parts broken away.

At intervals throughout the length of the cylinder assembly, means for rotating the cylinder are provided. These means simply consist of utilizing a ring 41, illustrated in Figure 2. This ring is driven by means of a belt 42, which belt in turn is connected to a driving pulley 43, fixed to a powered shaft 44. This powered shaft receives its power from any suitable source, such as a take-off of the tractor to which the device is attached. In Figure 2, this is illustrated by means of a belt connection 45 to a pulley 46, fixed to the shaft 44. The belt driving means may be substituted for any other suitable means, such as sprocket and chain, and pinion and gear.

The screw conveyor 36 is also driven from the powered shaft 44 by means of pulleys 47 and 48 and a belt connection 49. (Any other suitable grain conveying device may be utilized instead of the conveyor screw, such as an endless belt conveyor.)

In order to provide easily accessible means for making adjustments to the parts within the cylinder, apertures are provided at desired points through the cylinder with removable cover plates 50.

Between each cylinder section a diverter 51 is disposed. This diverter may be attached to any suitable point on the frame and is at a distance in front of the cylinder sufficiently to clear the stripping teeth. The object of this diverter is to force the grain to either side. This is necessary because any grain contacting the space between consecutive sections would not be stripped, and by keeping the grain out of this area the efficiency of the machine is increased. It is also desirable to employ diverters at the ends of the cylinder assembly and this may be accomplished by means of end plates 52 fixed to the frame of the machine, substantially as shown. It is preferable to have these plates large enough to cover that portion of the circumference of the cylinder through which the grain is stripped and carried, so that there will be no loss of grain at the ends. Such losses may ordinarily occur from the movement of the grain or from the wind blowing across the cylinder. It is also desirable to provide casings 53 extending from the plates 52 about the forward part of the end rings 22 to prevent grain in stalks from contacting this part of the device and clogging the machinery.

An additional improvement is the provision of means to right any fallen or lodged stalks into the path of the stripping teeth. Otherwise, such lodged grain may escape the action of the machine entirely. These means consist of a bar 54 disposed parallel and in front of the cylinder assembly 21, supported by a pair of arms 55 hinged to the frame of the machine, substantially as shown. These arms 55 are supported on the ground by means of castors 56. Ordinarily, it will not be necessary to use these means because lodged grain is not a usual situation. In such cases, the bar 54 may be swung out of operating position into the position indicated by dotted lines in Figure 1.

In order to use the bar 54 effectively, it is necessary to direct the machine through the field of grain in a direction opposite to that in which the grain has fallen or become lodged. Ordinarily, the standing grain will fall or become lodged in one general direction, due to the action of wind, rain, or other similar factors obtaining at the particular locality. As the bar 54 moves through the field in advance of the stripping teeth, it contacts the grain stalks underneath and as it slides under the inclined grain stalks, moving toward the root ends of the stalk, it elevates them sufficiently to bring the heads of grain in the path of the stripping teeth.

Having thus described my invention, I claim:

1. In a device of the character described having a horizontal rotatable cylinder and grain stripping teeth projecting through said cylinder, means for raising lodged grain stalks, comprising a bar hinged to the frame of the device, normally disposed in front of the cylinder, and castors fixed to said bar for supporting it close to the ground.

2. In a harvester of the type mentioned having a horizontal rotatable cylinder and grain stripping teeth projecting through said cylinder, means for raising lodged uncut cereal stalks when the harvester is moving in the general direction opposite to that in which the stalks are lodged, said means comprising a bar disposed horizontally in front of the machine forward of and below said cylinder, casters for supporting said bar over the ground and at such a distance that the bar can contact the bottom sides of the lodged stalks and, while advancing forward, elevate the grain heads of the lodged stalks in the path of said stripping teeth, arms secured to said bar extending rearwardly, the rearward ends of each arm being pivoted to the harvester at a point where the bar can be swung out of operative position over said cylinder.

HARRY THOMAS CORY.